United States Patent
Gersabeck et al.

(10) Patent No.: US 11,021,135 B2
(45) Date of Patent: Jun. 1, 2021

(54) METHOD AND APPARATUS FOR REMOTE VEHICLE FUNCTION CONTROL

(71) Applicant: FORD GLOBAL TECHNOLOGIES, LLC, Dearborn, MI (US)

(72) Inventors: David Martin Gersabeck, Commerce Township, MI (US); David Anthony Hatton, Orchard Lake, MI (US); Ziad Alhihi, Dearborn, MI (US); Michael Andrew Simons, Sterling Heights, MI (US); Thomas Nelson, Plymouth, MI (US); Ryan Conroy, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 15/674,601

(22) Filed: Aug. 11, 2017

(65) Prior Publication Data
US 2019/0047512 A1    Feb. 14, 2019

(51) Int. Cl.
*B60R 25/24* (2013.01)
*H04W 76/14* (2018.01)
*B60R 25/20* (2013.01)

(52) U.S. Cl.
CPC ............ *B60R 25/24* (2013.01); *B60R 25/209* (2013.01); *H04W 76/14* (2018.02); *B60R 2325/101* (2013.01); *B60R 2325/205* (2013.01)

(58) Field of Classification Search
CPC .............. B60R 25/24; B60R 2325/101; B60R 2325/205
See application file for complete search history.

(56) References Cited

U.S. PATENT DOCUMENTS

| | | | |
|---|---|---|---|
| 9,483,886 B2 | 11/2016 | Bergerhoff et al. | |
| 2007/0001805 A1* | 1/2007 | Utter | B60R 25/24 340/5.72 |
| 2009/0096596 A1* | 4/2009 | Sultan | G07C 5/008 340/426.13 |
| 2011/0257817 A1* | 10/2011 | Tieman | B60R 25/24 701/2 |
| 2011/0264304 A1* | 10/2011 | Burzio | B60R 25/04 701/2 |
| 2013/0141212 A1 | 6/2013 | Pickering | |
| 2014/0266594 A1* | 9/2014 | Reiser | B60R 25/24 340/5.72 |
| 2014/0277837 A1* | 9/2014 | Hatton | B60R 25/24 701/2 |
| 2014/0313009 A1* | 10/2014 | King | G08C 17/02 340/5.61 |
| 2014/0342668 A1 | 11/2014 | Kyomitsu | |
| 2015/0156297 A1 | 6/2015 | Crawford et al. | |
| 2015/0274125 A1* | 10/2015 | Lin | B60R 25/24 701/2 |
| 2016/0110938 A1* | 4/2016 | Kleve | G07C 9/00007 340/5.61 |

(Continued)

*Primary Examiner* — Donald J Wallace
(74) *Attorney, Agent, or Firm* — Michael Spenner; Brooks Kushman P.C.

(57) ABSTRACT

A system includes a processor configured to wirelessly communicate with a mobile device application. The processor is further configured to receive a vehicle-command from the mobile device application and send a wireless instruction to a vehicle instructing an action corresponding to and responsive to the received vehicle command.

12 Claims, 4 Drawing Sheets

(56) References Cited

U.S. PATENT DOCUMENTS

| | | | |
|---|---|---|---|
| 2016/0203661 A1* | 7/2016 | Pudar | B60R 25/24 |
| | | | 340/5.25 |
| 2017/0018132 A1* | 1/2017 | Seagraves | G07C 9/00309 |
| 2017/0232931 A1* | 8/2017 | Fernando | B60R 25/24 |
| | | | 701/2 |
| 2018/0096546 A1* | 4/2018 | Bartels | H04W 4/80 |
| 2018/0154867 A1* | 6/2018 | Golduber | G06Q 10/02 |

* cited by examiner

METHOD AND APPARATUS FOR REMOTE VEHICLE FUNCTION CONTROL

TECHNICAL FIELD

The illustrative embodiments generally relate to methods and apparatuses for remote vehicle function control.

BACKGROUND

Vehicle ignition and entry systems have advanced a great deal over the past few decades. Previously both requiring use of a key, these systems now often function with no more than the touch of a hand or finger, as long as a fob is present. The fob, which used to provide push-button unlock (on the fob), and sometimes remote start or entry functions (also accessed on the fob), now often includes technology allowing the user to access aspects of the vehicle based on user/vehicle interaction in the presence of a fob in a user pocket or purse.

While the vehicle-interaction and fob-presence model is certainly more convenient than having to search for a fob in a pocket or purse to access vehicle functions, many people still find the fob as representing yet another inconvenient device that they have to carry and/or can lose.

A proposed alternative to the fob model is a phone as a key model, in which the phone itself has native or app-driven fob functionality. This turns out to be a rather difficult solution to actually implement though, for a variety of reasons, and has not yet found traction as a viable solution to replace fobs on any large scale.

SUMMARY

In a first illustrative embodiment, a system includes a processor configured to wirelessly communicate with a mobile device application. The processor is further configured to receive a vehicle-command from the mobile device application and send a wireless instruction to a vehicle instructing an action corresponding to and responsive to the received vehicle command.

In a second illustrative embodiment, a system includes a mobile device processor configured to detect the presence of a fob-device configured for communication with a mobile device application executed by the mobile device processor. The processor is also configured to present a set of vehicle-functions controllable by the fob-device, receive selection of a vehicle function and send a wireless instruction, corresponding to the vehicle function, to the fob device.

In a third illustrative embodiment, a computer-implemented method includes storing a plurality of vehicle control credentials corresponding to a plurality of vehicles on a local memory of a fob-device. The method also includes wirelessly receiving instructions from a mobile device, selecting one of the plurality of vehicles and utilizing the control credentials corresponding to the selected vehicle to provide vehicle control functionality, such that only the selected vehicle is controllable by the fob-device until new instructions selecting a different one of the plurality of vehicles are received from the mobile device.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
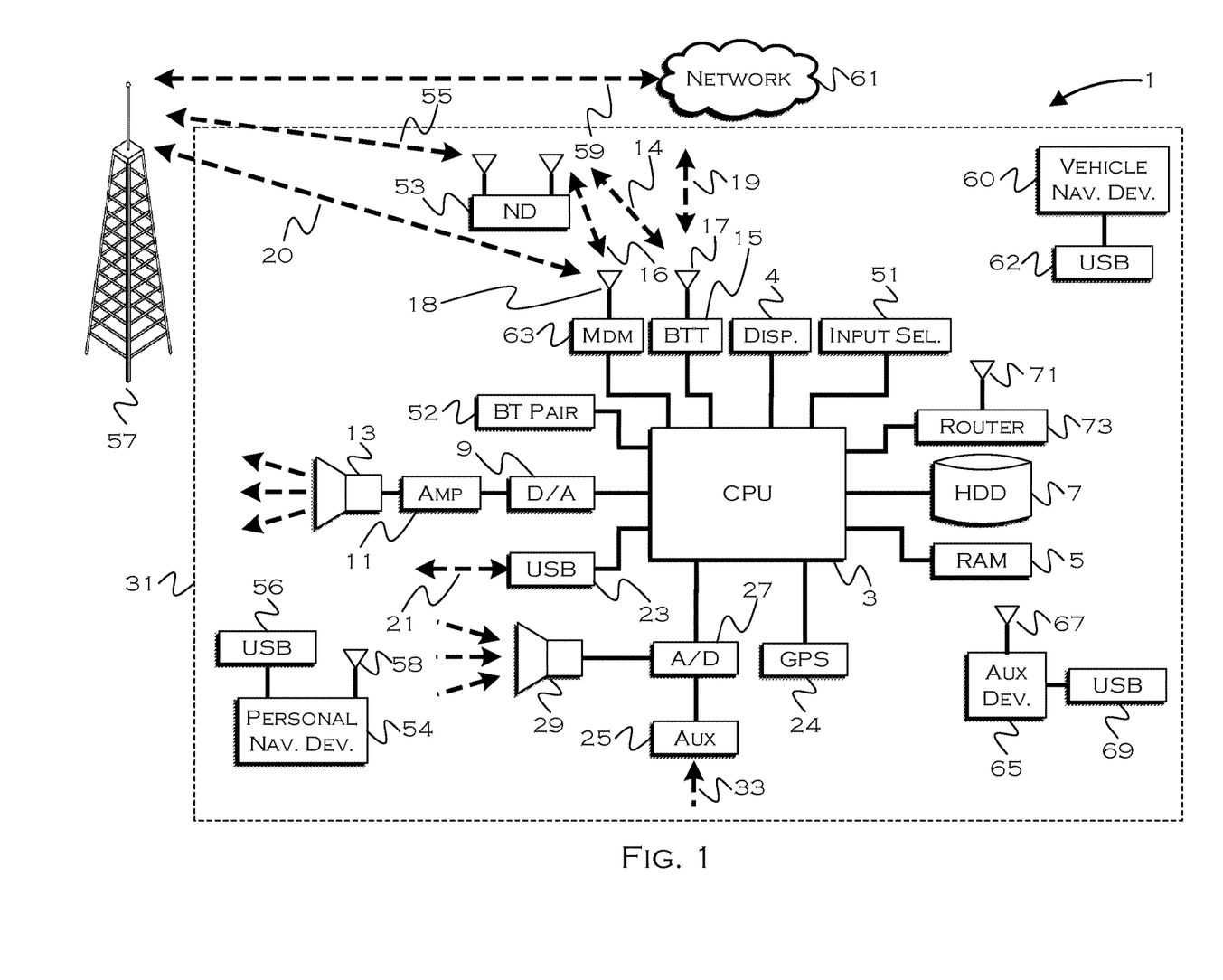
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLU-ETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While pure phone-as-a-key may be difficult to implement, due to many various considerations creating difficulty in leveraging a device, such as a phone, over which an automotive OEM has little to no control, as a vehicle ignition device, the illustrative embodiments do provide functionality on a phone or other mobile device that allows a user to interact with the phone and effectively utilize aspects of fob functionality. In the illustrative examples, a portable device such as a credit-card sized (or other similarly portable device) device, which can be provided by a vehicle OEM, includes fob-like transmission capabilities. That is, the device is capable of functioning for the purpose of unlock based on device presence, and, for example, ignition start based on device-presence. This generally may work in the same manner that an actual fob being present would work.

In one illustrative example, a phone case includes an electrical connection and a receiving bay for a fob-device. If the fob device is card-like, for example, the device can be clipped, popped or slid into a reception bay provided on the rear of a case or a case interior. The case may have an independent power supply and the fob itself may also have a power supply such as a coin battery. Securing the fob to the case may allow the fob to be powered through the case, from the a phone attached to the case, or using the fob's own power if neither phone nor case can provide sufficient power.

One aspect of the illustrative embodiments allows the fob-card (called such illustratively, although it is not constrained to only the shape and form of a card) to function as a presence-device for multiple vehicles. That is, a user can use the device as a proxy for a fob in order to touch-unlock and touch-start multiple different vehicles. In this example, the fob-card learns the security sequence for multiple vehicles, and stores the necessary authentication data for those vehicles on the fob-card. A user can use a mobile device interface, such as one provided by a smart phone in communication with the fob-card, to select a particular vehicle for which the fob will be enabled. In this example, the fob-card is then set to interact with the selected vehicle, and interaction with a different stored vehicle would require the user to select a new vehicle via the interface.

Since the fob-card may not have physical controls (lock/unlock/start/trunk, etc.) provided thereon, and itself may simply function as a presence-device for vehicle-interaction enablement in the absence of a control-device, a smartphone application, or other similar device application, may serve as a proxy for the typical onboard controls of a traditional fob. That is, for a selected vehicle, the phone application may present a typical set of fob controls, or even advanced controls not commonly found on a fob, as more interface space will be available. Pressing a control selection may cause the phone to communicate with the fob, which then communicates with the vehicle. This keeps the security functions with regards to vehicle communication native to the fob device (provided by the vehicle manufacturer) and still allows for usage of the phone to effectively control the vehicle.

That is not to suggest that there is not also security between the phone and the fob-card, and a certain application may require a password or other encryption protocol to even access the fob. This would prevent a user standing near another user's fob-card from accessing that fob-card. But in the model whereby the fob-card sends the command to the vehicle, responsive to the instruction from the phone application, the manufacturer does not need to expose the security functions/protocols of the fob-card itself to any security exploits that may be present on a phone, over which the manufacturer has little or no control. Also, in this scenario, even if a phone were hacked, someone could not copy the vehicle access protocols from the phone, but at best may be able to utilize the fob-card through a secondary device, which would still mean that the card would have to be present in order to access vehicle controls or functionality.

In another example, the fob-card may have physical controls, and even LEDs provided thereon. This can allow the fob to function as a physical device much in the manner of a traditional fob, even in the absence of the case or phone. By using the phone, a user can choose which of a set of programmed vehicles the fob will currently control, and then, when the fob is in a detached state and out of communication with the phone, the fob can preserve the settings for the particular vehicle and function as a fob for that selected vehicle. Under this model, whenever the fob is re-paired with a permissible phone, the phone can be used to select a different vehicle to be controlled. LED indicators on the fob can indicate connection states, command success, pairing modes and even which vehicle is currently chose (e.g., if there are 4 LEDS, each could correspond to one of four vehicles, and pressing a fob button would cause the correct LED for the currently chosen vehicle to flash, indicating to which vehicle the fob was currently set).

In one example, the mobile device application can be used to command fob-functions through the mobile device. In this example, the fob-card may actually be connected to a vehicle via a wireless protocol such as BLE, which can provide the phone with additional functionality over a traditional fob. That is, a traditional fob may control locks, a rear hatch, and remote start, but since the fob-card can send BLE commands (when BLE connected), the phone could provide a user with additional commands (e.g., window-control) and selection of the command would cause the phone to relay the command through the fob to the vehicle via the wireless connection.

Figure 2A:
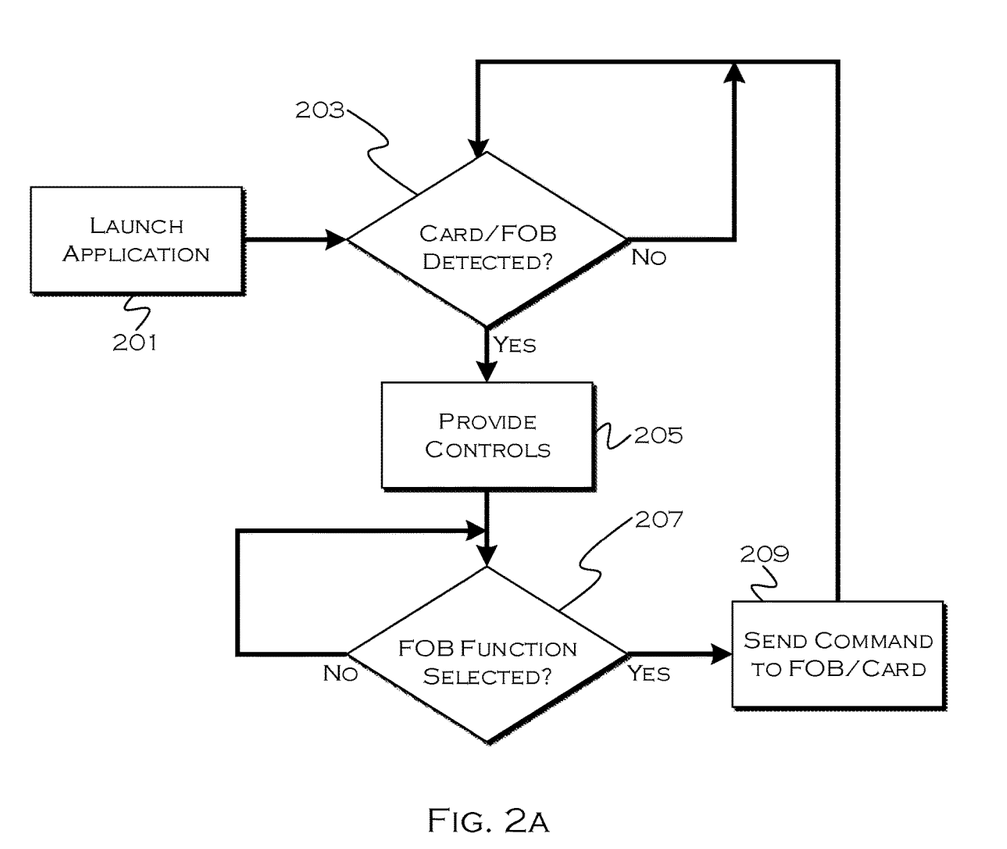
FIG. 2A shows an illustrative example of vehicle control process executing on a mobile device.

FIG. 2A shows an illustrative example of vehicle control process executing on a mobile device. In this illustrative example, the control process executes as an application on a mobile device or similar portable device including a user-interface. This could include, but is not limited to, a tablet, a smart watch or even a portable computer.

The user launches 201 a control application, which in this example provides control over the vehicle fob-functions by using communication with the vehicle facilitated by the fob. That is, the commands are not sent directly from the phone to the vehicle, but rather the commands are sent to the fob, which then appropriately instructs the vehicle to take the corresponding action responsive to the command from the application.

In this example, after the application is launched, it seeks communication 203 with a fob-card or similar device. In at least one example, the similar device could be a fob itself, which could be provided with the multi-vehicular capability described herein, although in other examples the device is a device that is more easily integratable with a phone if desired (e.g., a card, a case, etc.). The process exchanges any necessary security credentials with the fob once detected, and then provides 205 a set of controls corresponding to user-selectable fob-functions. In another example, the fob could be paired with a phone, so that launching the application would cause the phone to communicate with an already-paired fob. Pairing may require the phone and/or fob to be placed into pairing mode and for the fob to advertise a BLE connection, for example, which can be accepted by the phone.

In one example, these controls include the more common fob controls, such as, for example, lock, unlock, alarm, remote start and trunk open. Even if the fob-device includes native functions controllable through traditional fob-controls (e.g., buttons), the phone may also include a set of controls that is more advanced than a typical set of fob controls. Accordingly, if desired, a greater range of control can be achieved through the phone than by using the fob alone. On the other hand, even if the fob includes no native control, once a vehicle has been selected by the phone, the fob may provide native passive entry passive start (PEPS) functionality for that vehicle, which means that even a buttonless fob, once configured, can be used to start a vehicle in the absence of the control-device (phone). This allows a user to provide the fob as a loan to a friend or to a child, and the borrower can still access and start the vehicle as though they possessed a traditional fob.

In this example, once a user selects 207 a particular fob-function on the phone interface, the process sends 209 an instruction to the fob, which is then responsible for communicating the instruction to the vehicle. Different command functions may be available for different vehicles which a single fob can control, and configuration of the command/control menu is discussed later herein. If a single menu with all possible commands is provided, and the particular vehicle selected lacks an instructed feature (e.g., moon-roof open, and the vehicle lacks a moon-roof), an alternative option would simply be to notify a user that this option is not available for the selected vehicle, or to make the option un-selectable, even if displayed.

The application running on the mobile device can provide a variety of functions when wirelessly interacting with the fob-card. For example, without limitation, the application can allow profile changing, request vehicles assigned to profile slots (or empty slot identification), obtain a current fob-charge status and active profile, disable a fob remote keyless entry function (RKE) or other function, receive and provide a low fob battery alert, obtain a fob wireless ID, enable/disable BLUETOOTH or other wireless advertising for the fob, change fob timing parameters, and obtain diagnostic parameters for a fob. Some of these functions may require a mechanic/dealer to use a special code to implement in some instances, but any or all could be provided to a user if desired.

For example, the application can be used to disable RKE commands on the fob, such as commands corresponding to fob-included buttons. This disabling may also occur when the fob is connected to the phone case, which can help prevent accidental triggering of a button while the case is in a user pocket. If the RKE has been automatically disabled, then detaching the fob-card may cause enablement of the RKE functions. If the RKE was manually (via the app) disabled, the disablement may persist until manually re-enabled. In another example, if the RKE was manually disabled, it may re-enable if a BLE connection is lost, rather than if the fob is disconnected from the case (which could also cause re-enablement). This model, re-enablement upon wireless connection loss, can allow a user to still use the fob functions if the phone and/or case battery dies.

Another application function can cause the fob to blink an LED responsive to a request. This can help identify which fob is paired to which phone if multiple fobs are present (on a home end-table, for example). In order to preserve battery life, a fob may not always be advertising a connection when not connected. Depressing a button on the fob (perhaps for a longer than normal duration) can cause the fob to go into pairing/advertising mode. This could be done without providing a different button, by requiring a longer button press or a pattern of button presses of buttons normally reserved for fob control-functions. An LED on the fob can indicate if the fob is in an advertising or pairing mode.

Figure 2B:
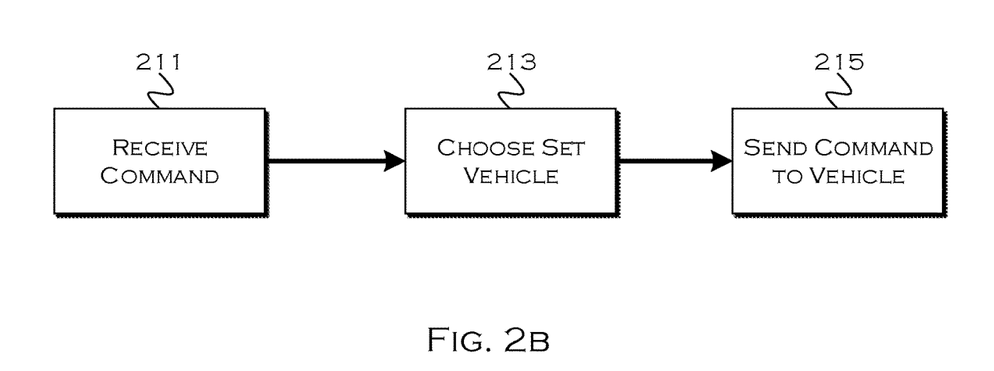
FIG. 2B shows an illustrative example of a fob-card command relay process.

FIG. 2B shows an illustrative example of a fob-card command relay process. In this example, the fob-card/device receives 211 the command from the authenticated phone application. The device then accesses 213 the security protocols necessary to authenticate a command to the selected vehicle. This is in the instance where more than one vehicle is controllable by the fob-card, otherwise a single native security protocol can be used when only one vehicle is controllable by the fob-card. The fob-card then sends 215 an instruction corresponding to the phone command to the vehicle.

Figure 3A:
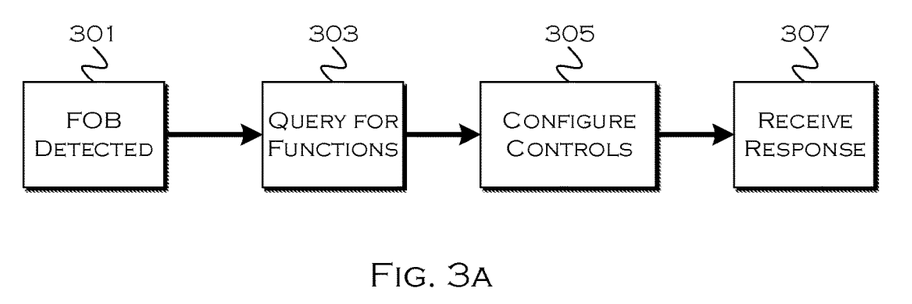
FIG. 3A shows an illustrative example of a fob-control presentation process executing on a mobile device.

FIG. 3A shows an illustrative example of a fob-control presentation process executing on a mobile device. In this example, the application executing on a mobile device communicates with a fob that includes control capability for more than one vehicle. Or, additionally or alternatively, the application may be authorized to communicate with a plurality of different fob-cards, which may also include varied vehicular functions depending on the particular vehicles controlled by the particular fob-cards.

Once the process detects 301 a fob-card and exchanges any necessary security authentications, the process sends 303 a query to the card to determine the functions that correspond to a currently selected vehicle. For example, if a fob-card controls vehicle A and vehicle B, and only vehicle B has heated seats, the functions presented on the application might only include heated seat controls when vehicle B is the selected vehicle to be controlled by the fob-card.

The fob-card responds 305 to the query with a set of controllable functions, or at least a set of additionally controllable functions (if certain functions, lock/unlock/start/truck, for example, are assumed). The process then configures 307 an application control menu, which can include adding or subtracting certain features or enabling/disabling certain features. This configuration can even include certain reporting functions, for example if vehicle B above is capable of reporting temperature to the fob-card and vehicle A is not, then the menu for vehicle B may include an internal-temperature reporting display, which would be removed or disable if the user chose vehicle A as the controllable vehicle.

In other models, the phone may have pre-stored the commands associated with a particular vehicle identification and/or fob. Querying the fob may result in fob identification (usable to select from a plurality of phone-known fobs) and vehicle identification (usable to select from a plurality of vehicle command-sets associated with the identified fob. Or, either one of these identifiers could be individually returned and/or responsively returned in response to different queries.

Figure 3B:
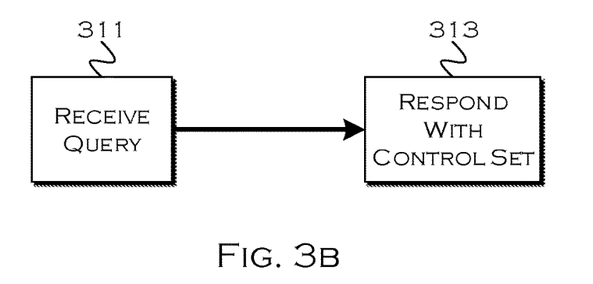
FIG. 3B shows an illustrative example of a fob-card control query-response process.

FIG. 3B shows an illustrative example of a fob-card control query-response process, and in this example the fob-card receives 311 the request from the phone application and responds 313 with an identified set of controllable functions/reporting options. As noted, the fob could also respond with a vehicle identifier and/or fob identifier, and the phone could simply look up (on the phone or remotely) commands associated with the identified fob/vehicle, as shown below with respect to FIG. 3C.

Figure 3C:
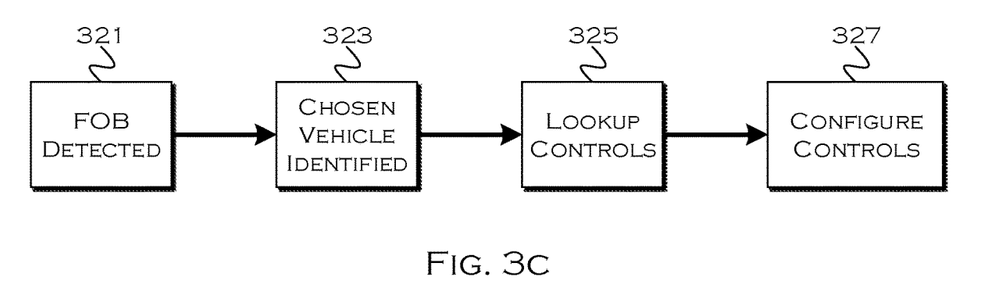
FIG. 3C shows alternative example of a fob-control presentation process executing on a mobile device.

FIG. 3C shows alternative example of a fob-control presentation process executing on a mobile device. In this example, the phone detects 321 a fob and receives 323 identification of a selected vehicle for fob-control. The receipt of identification can be a message from the fob, or it can be a selection made by the phone and/or previously saved by the phone.

In this example, the phone uses a lookup to find out what controls are included with the fob-card functionality for the selected vehicle. This can include a lookup 325 on a local database storing various vehicle control configurations on a phone, or a query to a remote source (OEM server or other remote data set). Using this data, the process then configures a menu in a manner similar to that discussed above.

Figure 4A:
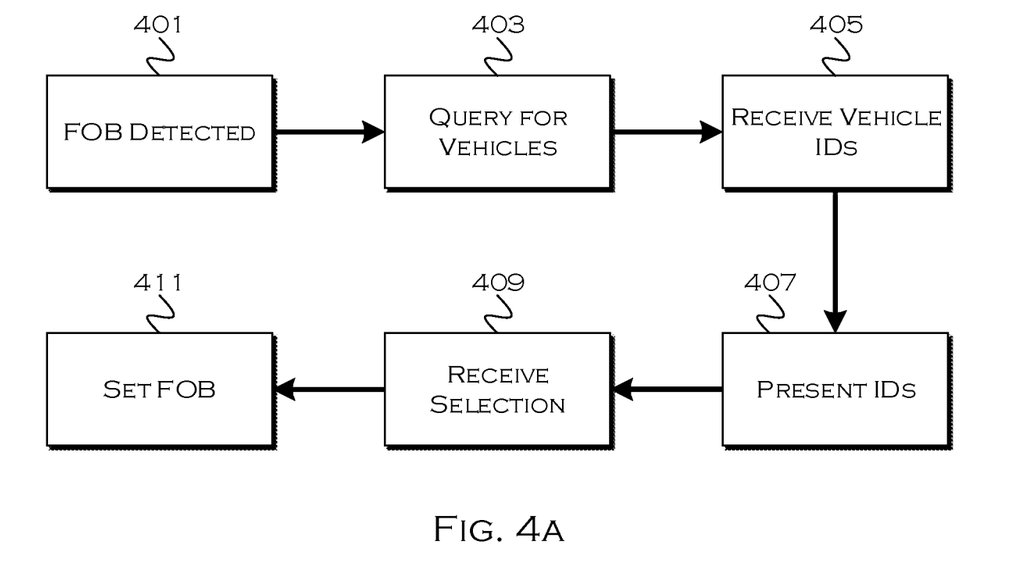
FIG. 4A shows an illustrative example of a fob vehicle-selection process executing on a mobile device.

FIG. 4A shows an illustrative example of a fob vehicle-selection process executing on a mobile device. In this example, the process detects 401 the fob, which in this example is configurable to control multiple different vehicles. The authentication data for each vehicle can be stored on the fob and/or obtained by a process such as a copy process from an existing vehicle fob, or in conjunction with the vehicle itself. Fob authentication copying can be done in a variety of manners, and the particular manner chosen does not generally affect the scope of this invention. The fob-card itself may have a limit on how many vehicles are locally storable, and until this limit is reached the phone can be used in the copying process to select un-assigned control sets. The phone can also be used to select a control set for overwriting, if the limit of vehicles exists and has been reached.

Once the phone application has authenticated itself with the fob-card, the phone sends 403 a request to the card querying which vehicles are controllable by the card, based on the data currently stored on the card. This data may have been configured through the phone application, and may also be stored locally on the phone following the configuration, but in the instances where multiple phone applications can interface with reconfigurable fob-cards, it may be useful to be able to obtain this information from the fob-card itself.

The phone receives 405 vehicle identifications (VIN, ESN or other suitable identification) from the fob-card and presents 407 these to a user, typically in a more understandable format if a serial number or other alpha-numeric identifier is used. That is, instead of presenting XX224XFR and XY332GGE, the phone may present FORD EXPLORER and FORD FOCUS. The user may also be able to save names for the vehicles, either on the fob or on the phone, so that instead of FORD EXPLORER and FORD FOCUS the user sees MOM'S EXPLORER and ALEXA'S FOCUS. If saved on the fob, these names could be returned instead of or in addition to the VIN/ESN/Identifier data. Both types of data may be desirable if the phone uses a lookup to identify particular vehicle functionality accessible through a certain fob setting.

The process then receives 409 a user-selection of a particular vehicle to be controlled by the fob-card and sends 411 an instruction to the fob-card to set itself to control the chosen vehicle. In this example, once so set, the card or other fob-device can then be loaned or passed to another user for PEPS functionality, at a minimum. If the application used an authentication process that is conveyable, the borrower could also receive a password which might allow that person to have limited fob functionality on a phone of their own. This could include, for example, control functions for the chosen vehicle, but not the ability to select a new vehicle. Or, in another example, a child might be able to use a restricted password to choose between a family SUV or sedan, but not access the family sports car. Tiered access permissions can be used in conjunction with different access credentials for the configuration/control applications, which allows a variety of security levels to be achieved while still making the fundamental PEPS and/or fob functionality transferrable through loan of the fob-card.

Figure 4B:
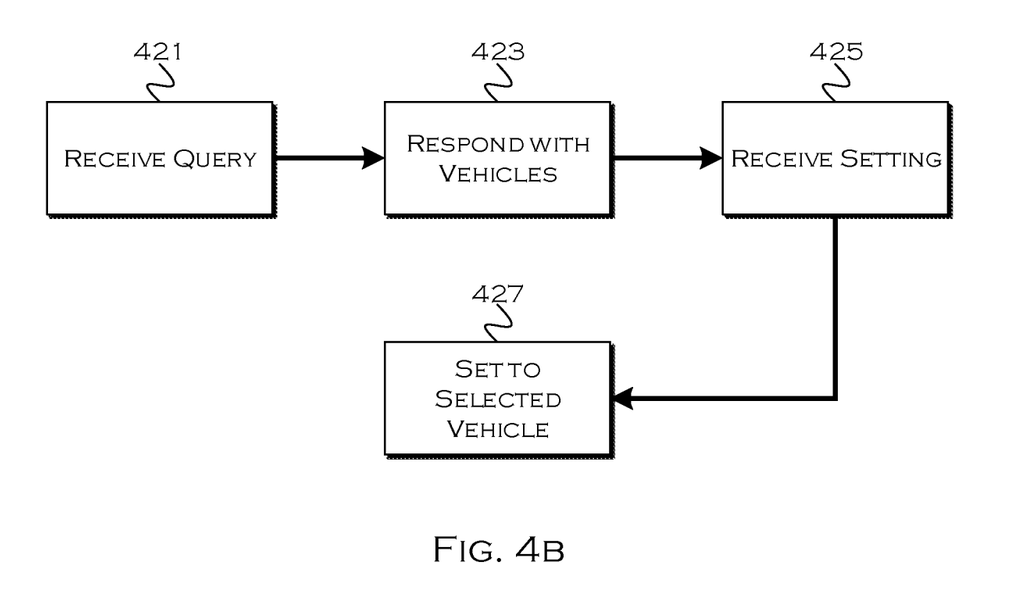
FIG. 4B shows an illustrative example of a fob-card setting process.

FIG. 4B shows an illustrative example of a fob-card setting process. In this example, the fob first receives 421 the query from the application, requesting a list of selectable vehicles. As noted above, if there is a tiering of access credentials, the fob could limit this list to the vehicles controllable by the fob that are also selectable by a certain user with the current credential set. So, for example, a child may not see a selection option for a family sports car, since the fob did not return that as a selectable option for the child's credential set provided by the child's phone application. An alternative is to return all vehicles but to block requests for those not approved for a certain credential set. Regardless of the particular paradigm chosen, in this example the fob-card returns 423 some form of a set (one or more) of user selectable vehicles.

The process then receives 425 a user selection of a vehicle from the application. If necessary, the fob-card can check permissions to access the requested vehicle controls, but multiple options (not-returning the unauthorized vehicle, blocking control selection at the phone, etc) that do not directly require the fob to block the request are also implementable. Assuming the user is approved to access the requested vehicle controls, the fob then selects 427 the security and communication credentials for the chosen vehicle and sets itself to control that vehicle. The fob typically remains configured to control the selected vehicle, and the selected vehicle only, until a new vehicle is selected, although the fob could also revert to a certain control set, or a NULL control set, after a time period for security purposes if desired.

Through the illustrative embodiments, a reconfigurable, multi-vehicle fob is achieved that can interface with a phone to provide phone-based fob control. This greatly expands fob convenience while mitigating some of the security concerns attendant with certain direct phone-to-vehicle controls.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a portable-device processor configured to:
wirelessly pair with a mobile device;
send identification of a plurality of vehicles controllable by the processor, to a mobile device application;
receive a selection, from the mobile device application, of one of the plurality of vehicles controllable by the processor;
wirelessly receive a vehicle command from the mobile device application; and
send a wireless instruction to the selected vehicle instructing an action corresponding to and responsive to the received vehicle command.

2. The system of claim 1, wherein the processor is included as part of a phone case.

3. The system of claim 1, wherein the processor is included as part of a credit card shaped device.

4. The system of claim 1, wherein the processor is configured to authenticate the mobile device application as being preapproved to control the vehicle.

5. The system of claim 1, wherein the processor is configured to provide mobile-device requested functionality to only the selected one of the plurality of vehicles.

6. The system of claim 1, wherein the processor is configured to provide a listing of vehicle functions controllable by the processor, for the selected vehicle, responsive to a request from the mobile device application.

7. The system of claim 1, wherein the processor is configured to provide passive entry passive start functionality while within a predefined proximity to a transponder of the selected vehicle.

8. A system comprising:
a mobile device processor configured to:
detect wireless connection advertising from a fob-device configured for communication with a mobile device application executed by the mobile device processor;
wirelessly connect using the advertised wireless connection;
present a set of vehicle-functions controllable by the fob-device and identified by the fob-device, following connection to the fob-device;
receive selection of a vehicle function on the mobile device; and
send a wireless instruction, corresponding to the selected vehicle function, to the fob-device.

9. The system of claim 8, wherein the mobile device processor is further configured to:
request a list of vehicles controllable by the fob-device from the fob-device;
receive the list of vehicles from the fob-device, responsive to the request;
present a selectable list of vehicles based on the received list, and
wherein the set of vehicle-functions identified by the fob device are identified for a selected vehicle.

10. A computer-implemented method comprising:
storing a plurality of vehicle control-credentials, corresponding to a plurality of vehicles, on a local memory of a fob-device;
transmitting identification of the plurality of vehicles to a mobile device;
wirelessly receiving instructions from the mobile device, selecting one of the transmitted plurality of vehicles; and
utilizing the control credentials corresponding to the selected vehicle to provide vehicle control functionality, such that only the selected vehicle is controllable by the fob-device until new instructions selecting a different one of the plurality of vehicles are received from the mobile device.

11. The method of claim 10, wherein the fob-device includes passive entry passive start (PEPS) functionality, further comprising providing PEPS functionality for only the selected vehicle until new instructions selecting a different one of the plurality of vehicles are received from the mobile device.

12. The method of claim 10, further comprising:
receiving a control-command, corresponding to a vehicle function controllable by the fob-device, from the mobile device at the fob-device; and
sending an instruction to the selected vehicle from the fob-device instructing control of the vehicle function in accordance with the received control-command.

* * * * *